March 9, 1926.
C. A. OHL
1,575,712
AUTOMOTIVE BRAKE
Filed Jan. 11, 1924
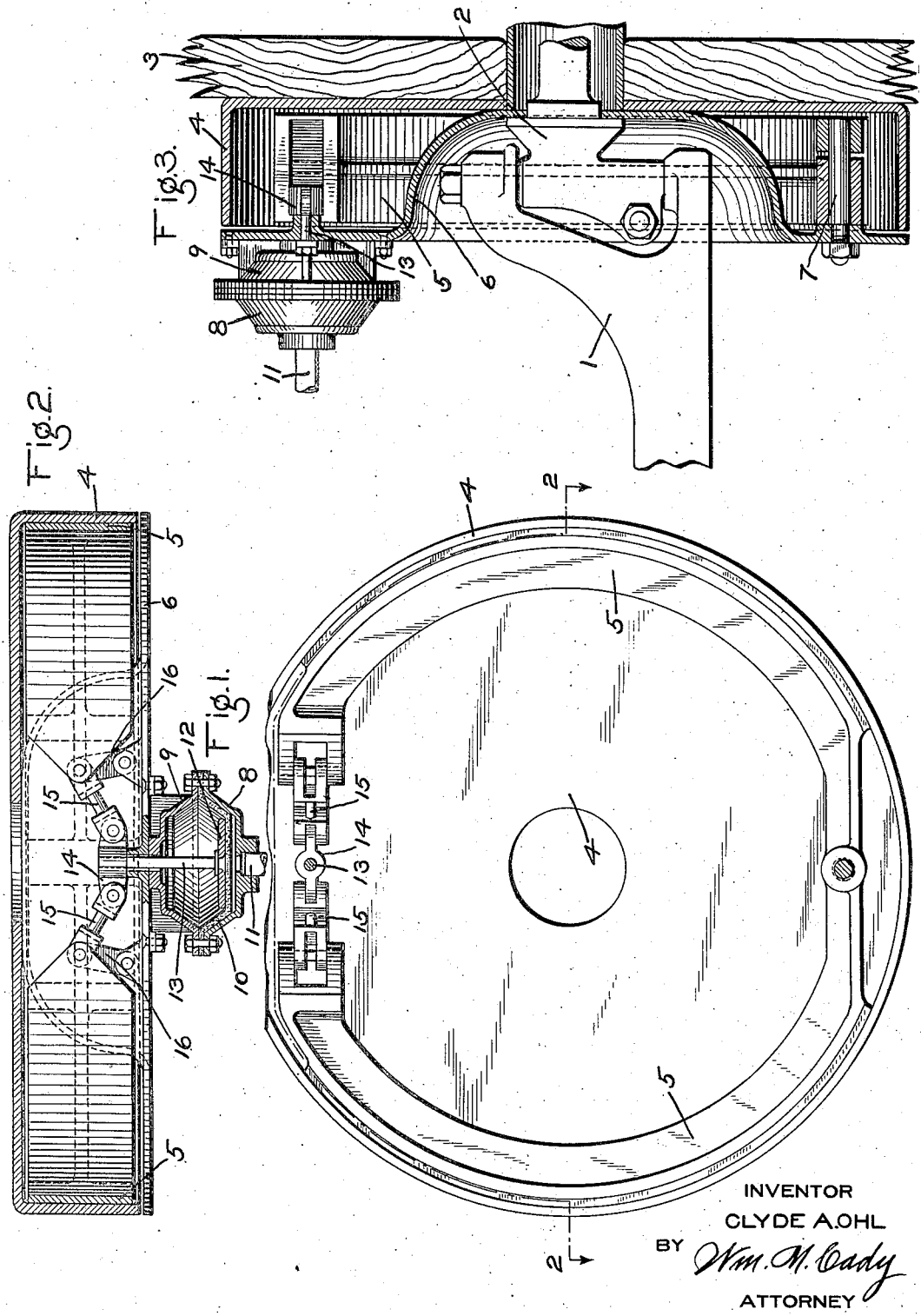
INVENTOR
CLYDE A. OHL
BY Wm. M. Cady
ATTORNEY Patented Mar. 9, 1926.

1,575,712

UNITED STATES PATENT OFFICE.

CLYDE A. OHL, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

AUTOMOTIVE BRAKE.

Application filed January 11, 1924. Serial No. 685,562.

*To all whom it may concern:*

Be it known that I, CLYDE A. OHL, a citizen of the United States, residing at Wilkinsburg, in the county of Allegheny and State of Pennsylvania, have invented new and useful Improvements in Automotive Brakes, of which the following is a specification.

This invention relates to brakes, and more particularly to a fluid pressure front wheel brake for a motor vehicle.

The principal object of my invention is to provide an improved fluid pressure controlled front wheel brake.

In the accompanying drawing; Fig. 1 is an inner face view of a brake drum type of brake constructed in accordance with my invention; Fig. 2 a section on the line 2—2 of Fig. 1; and Fig. 3 a section in the plane of the steering knuckle axis and at a right angle to the plane of Fig. 1.

In the drawing, the reference numeral 1 indicates a portion of the front axle of a motor vehicle having the usual knuckle 2 carrying a front wheel 3. To the wheel 3 is secured a brake drum 4 having an internal friction face and adapted to engage said friction face are the usual pivotally connected brake heads 5. Secured to the knuckle 2 in any suitable manner is a cover plate 6 having a central depression to provide clearance for the knuckle 2 and the end of the axle 1.

The brake heads 5 are pivotally supported by the plate 6 through the pivot pin 7. To the upper portion of the plate 5, a diaphragm brake chamber is secured and said brake chamber comprises flanged casing members 8 and 9 having a flexible diaphragm 10 secured between the flanges of the casing members.

A fluid pressure supply and exhaust pipe 11 is connected to the chamber at one side of the diaphragm 10 and a pressure plate 12 engages the opposite side of the diaphragm. A rod 13 is secured to said pressure plate and extends through a central opening in the casing member 9 and also through an opening in the plate 6.

To the outer end of the rod 13 is secured a link or cross-head 14 and pivotally connected to said link are toggle levers 15. The outer ends of said levers are pivotally connected to the free ends of the brake heads 5.

In order to prevent lateral movement of the brake heads due to the lateral thrust exerted when pressure is applied to the diaphragm 10, the ends of the brake heads are tied to the cover plate 6 by means of pivotally connected links 16.

In operation, when fluid under pressure is supplied through pipe 11 to the diaphragm 2, said diaphragm is forced outwardly and thereby the toggle levers 15 are operated to spread the adjacent ends of the brake heads 5, so that the brake heads are forced into frictional engagement with the friction face of the brake drum 4, to effect an application of the brakes.

The brake heads are prevented from moving laterally during the operation of applying the brakes by means of the links 16, as will be evident.

Having now described my invention, what I claim as new and desire to secure by Letters Patent, is:—

1. In a vehicle brake, the combination with a brake drum, brake heads mounted in said drum, and a cover plate for said drum, of a brake chamber secured to said cover plate, a movable abutment in said brake chamber disposed in a vertical plane, a rod operable by said abutment having its axis at right angles to the plane of the cover plate, and a toggle lever mechanism operatively connecting said rod with said brake heads.

2. In a vehicle brake, the combination with a brake drum, brake heads mounted in said drum, and a vertically disposed cover plate for said drum, of a brake chamber secured to said cover plate, a flexible diaphragm mounted in said brake chamber and disposed in a vertical plane, a horizontally movable rod operable by said diaphragm, a link connected to said rod, and levers connecting said link to the ends of said brake heads.

3. In a vehicle brake, the combination with a brake drum, brake heads mounted in said drum, and a cover plate for said drum, of a brake chamber secured to said cover plate, a movable abutment in said brake chamber, a rod operable by said abutment, means operatively connecting said rod with the ends of said brake heads, and means for restraining said brake heads against lateral movement.

4. In a vehicle brake, the combination with a brake drum, brake heads mounted in said drum, and a cover plate for said drum, of a brake chamber secured to said cover plate, a movable abutment in said brake chamber, a rod operable by said abutment, means operatively connecting said rod with the ends of said brake heads, and links connecting the ends of said brake heads to said cover plate to prevent lateral movement of the brake heads.

In testimony whereof I have hereunto set my hand.

CLYDE A. OHL.